United States Patent [19]

Yoo et al.

[11] Patent Number: 4,963,520

[45] Date of Patent: Oct. 16, 1990

[54] METAL-CONTAINING SPINEL COMPOSITION AND PROCESS OF USING SAME

[75] Inventors: Jin S. Yoo, Flossmoor; Cecelia A. Radlowski, Riverside, both of Ill.; John A. Karch, Marriottsville; Alakananda Bhattacharyya, Columbia, both of Md.

[73] Assignee: UOP, Des Plaines, Ill.

[21] Appl. No.: 180,577

[22] Filed: Aug. 1, 1988

Related U.S. Application Data

[63] Continuation of Ser. No. 848,954, Apr. 7, 1986, Pat. No. 4,790,982.

[51] Int. Cl.$^5$ .................. B01J 29/06; B01J 23/02; B01J 21/04

[52] U.S. Cl. ..................... 502/64; 502/65; 502/66; 502/304; 502/524

[58] Field of Search ............... 502/524, 304, 64, 65, 502/66

[56] References Cited

U.S. PATENT DOCUMENTS

| | | | |
|---|---|---|---|
| Re. 27,639 | 5/1973 | Thomas et al. | 260/672 T |
| 3,140,253 | 7/1964 | Rosinski et al. | 208/120 |
| 3,692,701 | 9/1972 | Box, Jr. | 502/524 |
| 3,751,508 | 8/1973 | Fujiso et al. | 502/524 |
| 3,823,092 | 7/1974 | Gladrow | 252/455 Z |
| 3,930,987 | 1/1976 | Grand | 208/111 |
| 4,001,375 | 1/1977 | Longo | 423/244 |
| 4,049,582 | 9/1977 | Erickson et al. | 502/524 |
| 4,081,408 | 3/1978 | Fischer et al. | 502/524 |
| 4,153,534 | 5/1979 | Vasalos | 208/120 |
| 4,153,535 | 5/1979 | Vasalos | 208/120 |
| 4,263,020 | 4/1981 | Eberly | 423/244 X |
| 4,310,440 | 1/1982 | Wilson et al. | 252/435 |
| 4,372,842 | 2/1983 | Gardiner | 423/239 X |
| 4,440,871 | 3/1984 | Lok et al. | 502/214 |
| 4,469,589 | 9/1984 | Yoo et al. | 208/120 |
| 4,471,070 | 9/1984 | Seifert et al. | 502/302 |
| 4,472,267 | 9/1984 | Yoo et al. | 208/120 |
| 4,472,532 | 9/1984 | Mooi | 502/302 |
| 4,476,245 | 10/1984 | Seifert | 502/302 |
| 4,492,677 | 1/1985 | Yoo et al. | 423/244 |
| 4,495,304 | 1/1985 | Yoo et al. | 502/66 |
| 4,495,305 | 1/1985 | Yoo et al. | 502/65 |
| 4,500,651 | 2/1985 | Lok et al. | 502/208 |
| 4,503,023 | 3/1985 | Breck et al. | 423/328 |
| 4,522,937 | 6/1985 | Yoo et al. | 502/302 |
| 4,613,428 | 9/1986 | Edison | 502/317 |
| 4,735,705 | 4/1988 | Buck, Jr. et al. | 502/524 |

OTHER PUBLICATIONS

"Structural Inorganic Chemistry" 3rd Editions (1962) by A. F. Wells, pp. 130, 487–490, 503 and 526.

"Advanced Inorganic Chemistry", 3rd Edition, by F. A. Cotton & G. Wilkenson (1972), pp. 54–55.

Selecion of Metal Oxides for Removing SOx from Glue Gas, Inc. Eng. Chemical Process Design Development vol. 10, Nov. 3, 1971.

D. W. Deberry, et al, "Rates of reaction of $SO_2$ with Metal Oxides"–Canadian Journal of Chemical Engineering, 49, 781 (1971).

"Modern Aspects of Inorganic Chemistry" by H. I. Emeleus and A. G. Sharpe (1973) pp. 57–58 and 512–513.

*Primary Examiner*—Carl F. Dees
*Attorney, Agent, or Firm*—Vincent J. Vasta, Jr.; Thomas K. McBride

[57] ABSTRACT

A composition of matter comprising at least one metal-containing spinel which includes a first metal and a second metal having a valence higher than the valence of the first metal, a minor amount of at least one-third metal component effective to promote the oxidation of sulfur dioxide to sulfur trioxide at sulfur dioxide oxidation conditions, and a minor amount of at least one-fourth metal component effective to promote the reduction of first metal sulfate at first metal sulfate reduction conditions. These compositions are useful, e.g., in hydrocarbon conversion processes, to reduce sulfur oxide and/or nitrogen oxide atmospheric emissions.

40 Claims, No Drawings

METAL-CONTAINING SPINEL COMPOSITION AND PROCESS OF USING SAME

This application is a continuation of prior U.S. application Ser. No. 848,954, filing date Apr. 7, 1986 now U.S. Pat. No. 4,790,982.

This invention relates to improved metal-containing spinel compositions, particularly for use in a manner to effect a reduction in the emission of sulfur oxides and/or nitrogen oxides to the atmosphere. In one specific embodiment, the invention involves compositions and processes for the catalytic cracking of sulfur-containing hydrocarbon feedstocks to effect a reduction in the amount of sulfur oxides and/or nitrogen oxides emitted from the regeneration zone of a hydrocarbon catalytic cracking unit.

Typically, catalytic cracking of hydrocarbons takes place in a reaction zone at hydrocarbon cracking conditions to produce at least one hydrocarbon product and to cause carbonaceous material (coke) to be deposited on the catalyst. Additionally, some sulfur, originally present in the feed hydrocarbons, may also be deposited, e.g., as a component of the coke, on the catalyst.

Sulfur-containing coke deposits tend to deactivate cracking catalyst. Cracking catalyst is advantageously continuously regenerated, by combustion with oxygen-containing gas in a regeneration zone, to low coke levels, typically below about 0.4% by weight, to perform satisfactorily when it is recycled to the reactor. In the regeneration zone, at least a portion of the sulfur, along with carbon and hydrogen, which is deposited on the catalyst, is oxidized and leaves in the form of sulfur oxides (sulfur dioxide and sulfur trioxide, hereinafter referred to a "SOx") along with substantial amounts of carbon monoxide, carbon dioxide and water. At least a portion of the nitrogen, which may be present in the coke deposits and/or in the oxygen-containing gas, is oxidized at the conditions in the regeneration zone to nitrogen oxides which also leave with the flue gas from the regeneration zone.

Considerable recent research effort has been directed to the reduction of sulfur oxide and nitrogen oxide atmospheric emissions, e.g., from the regeneration zones of hydrocarbon catalytic cracking units. One technique that has been suggested for reducing such sulfur oxide emissions involves circulating one or more metal oxides capable of associating with oxides of sulfur with the cracking catalyst inventory in the regeneration zone. When the particles containing associated oxides of sulfur are circulated to the reducing atmosphere of the cracking zone, the associated sulfur compounds are released as gaseous sulfur-bearing material such as hydrogen sulfide, which is discharged with the products from the cracking zone and is in a form which can be readily handled in a typical facility, e.g., petroleum refinery. The metal reactant is regenerated to an active form, and is capable of further associating with the sulfur oxides when cycled to the regeneration zone.

A metallic component, either incorporated into catalyst particles or present on any of a variety of "inert" supports, is exposed alternately to the oxidizing atmosphere of the regeneration zone of an FCCU and the reducing atmosphere of the cracking zone to reduce sulfur oxide emissions from regenerator gases in accordance with the teachings of Vasalos and Vasalos, et al. U.S. Pat. Nos. 4,153,534 and 4,153,535, respectively. In Vasalos, et al., a metallic oxidation promoter, consisting of components of ruthenium, rhodium, palladium, platinum, osmium, iridium, platinum, vanadium, uranium, zirconium, rhenium, silver and mixtures thereof is also present when carbon monoxide emissions are to be reduced. Vasalos, et al., teaches that the more preferred metallic promoter consists of components of ruthenium, rhodium, palladium, osmium, iridium, platinum and rhenium. These patents disclose nineteen different metallic components, including materials as diverse as alkaline earths, sodium, heavy metals and rare earth, as being suitable reactants for reducing emissions of oxides of sulfur. The metallic reactants that are especially preferred are sodium, magnesium, manganese and copper. The carriers for the metallic reactants, preferably have surface areas of at least 50 square meters per gram. Examples of allegedly "inert" supports are silica, alumina and silica-alumina. The Vasalos and Vasalos, et al., patents further disclose that when certain metallic reactants (exemplified by oxides of iron, manganese or cerium) are employed to capture oxides of sulfur, such metallic components can be in the form of a finely divided fluidizable powder.

A vast number of sorbents have been proposed for desulfurization of non-FCCU flue gases in zones outside the unit in which SOx is generated. In some such non-FCCU applications, the sorbents are regenerated in environments appreciably richer in hydrogen than the cracking zone of an FCC unit. Fifteen adsorbents are disclosed for flue gas desulfurization in a publication of Lowell, et al., "SELECTION OF METAL OXIDES FOR REMOVING SOx FROM FLUE GAS," Ind. Eng. Chemical Process Design Development, Vol. 10, Nov. 3, 1971. In Longo U.S. Pat. No. 4,001,375, cerium on an alumina support is used to absorb SO2 from non-FCCU flue gas streams or automobile exhaust at temperatures of 572° to 1472 degrees F., preferably 932° to 1100 degrees F.

D. W. Deberry, et al., "RATES OF REACTION OF S02 WITH METAL OXIDES," Canadian Journal of Chemical Engineering, 49, 781 (1971) reports that cerium oxide was found to form sulfates more rapidly than most of the other oxides tested. The temperatures used, however, were below 900 degrees F. and thus below those preferred for use in catalyst regenerators in FCC units.

Many commercial zeolitic FCC catalyst contain up to 4% rare earth oxide, the rare earth being used to stabilize the zeolite and provide increased activity. See, for example, Grand U.S. Pat. No. 3,930,987 to grand. The rare earths are most often used as mixtures of $La_2O_3$, $CeO_2$, $Pr_6O_{11}$, $Nd_2O_3$ and others. Some catalyst is produced by using a lanthanum-rich mixture obtained by removing substantial cerium from the mixture of rare earth. It has been found that the mere presence of rare earth in a zeolitic cracking catalyst will not necessarily reduce SOx emissions to an appreciable extent.

In accordance with the teachings of Gladrow U.S. Pat. No. 3,823,092, certain zeolitic catalyst compositions capable of being regenerated at a rate appreciably faster than prior art rare earth exchanged zeolitic catalyst compositions are produced by treating a previously rare earth exchanged zeolitic catalyst composition with a dilute solution containing cerium cations (or a mixture of rare earths rich in cerium). The final catalysts contain 0.5 to 4% cerium cations which are introduced to previously rare earth exchanged zeolitic catalyst particles prior to final filtering, rinsing and calcining. Cerium is described as an "oxidation promoter".

Thus, considerable amount of study and research effort has been directed to reducing oxide of sulfur emissions from various gaseous streams, including those from the stacks of the regenerators of FCC units. Many metallic compounds have been proposed as materials to pick up oxides of sulfur in FCC units (and other desulfurization applications). Many of the proposed metallic compounds or reactants lose effectiveness when subjected to repeated cycling. Thus, when Group II metal oxides are impregnated on FCC catalysts or various supports, the activity of the Group II metals is rapidly reduced under the influence of the cyclic conditions. Discrete alumina particles, when combined with silica-containing catalyst particles and subjected to steam at elevated temperatures, e.g., those present in FCC unit regenerators, are of limited effectiveness in reducing SOx emissions. Incorporation of sufficient chromium on an alumina support to improve SOx sorption results in undesirably increased coke and gas production. The presence of vanadium in the hydrocarbon feedstock to a catalytic cracking unit is known to have a deleterious effect on the cracking operation. For example, this vanadium, which deposits on the catalyst, tends to poison the catalyst, i.e., tends to inhibit the catalyst's ability to promote the desired cracking chemical reactions. This is one reason for the reluctance to even consider the use of vanadium in cracking operations.

U.S. Pat. Nos. 4,469,589 and 4,472,267, relate to improved materials for reducing SOx emissions comprising spinels, preferably alkaline earth metal, aluminum-containing spinels, which materials may contain one or more other metal components capable of promoting the oxidation of sulfur dioxide to sulfur trioxide at combustion conditions. Such metallic components include components of Group IB metals, Group IIB metals, Group IVB metals, Group VIA metals, Group VIB metals, Group VIIA metals, Group VIII metals, the rare earth metals, vanadium, iron, tin, antimony and mixtures thereof. In specific examples, these patents disclose that magnesium, aluminum-containing spinel is impregnated with such other metal components (e.g., cerium and platinum) using conventional techniques. In addition, these patents disclose that in situations where the spinel normally contains aluminum ions, other trivalent metal ions, such as iron, chromium, vanadium, manganese, gallium, boron, cobalt and mixtures thereof, may replace all or a part of the aluminum ions. U.S. Pat. Nos. 4,471,070; 4,472,532; 4,476,245; 4,492,677; 4,492,678; 4,495,304; 4,495,305 and 4,522,937 also relate to spinel compositions useful to reduce sulfur oxide atmospheric emissions. The specification of each of these patents is incorporated herein by reference. There remains a need for still further improved spinel compositions exhibiting good SOx removal and/or nitrogen oxide reduction properties.

In one general aspect, the present invention involves a composition, hereinafter referred to as "ROS", comprising at least one metal-containing spinel, preferably a major component of such spinel, which includes a first metal and a second metal having a valence higher than the valence of the first metal, a minor amount of at least one component of a third metal other than the first and second metals effective to promote the oxidation of sulfur dioxide to sulfur trioxide at sulfur dioxide oxidation conditions, and a minor amount of at least one component of a fourth metal other than the first, second and third metals effective to promote the reduction of first metal sulfate at first metal sulfate reduction conditions; provided that in the event the third metal is rare earth metal, the fourth metal is other than vanadium. Vanadium, rare earth metal-containing spinel compositions are disclosed and claimed in commonly assigned U.S. patent application Ser. No. 849,025 filed Apr. 7, 1986 and now abandoned, the specification of which is incorporated by reference herein. In another embodiment, the invention involves a catalyst system comprising, in intimate admixture, a major amount of solid particles capable of promoting hydrocarbon conversion at hydrocarbon conversion conditions, and a minor amount of discrete entities having a chemical make-up which is different from the solid particles and which comprises the ROS described above. The present ROS have been found to provide for both outstanding effectiveness in removing sulfur oxides, e.g., from the catalyst regeneration zones of hydrocarbon catalytic cracking units, and improved effectiveness in releasing associated sulfur oxide, e.g., in the reaction zones of hydrocarbon catalytic cracking units. The amounts of third and fourth metals present in the ROS are preferably chosen so that the third and fourth metal components have no substantial detrimental effect on the hydrocarbon conversion, e.g., cracking process.

In a further embodiment, the invention relates to a process for reducing at least one, preferably both, of (1) the sulfur oxide content of a sulfur oxide-containing gas and (2) the nitrogen oxide content of a nitrogen oxide-containing gas which comprises contacting the gas with a material at conditions to reduce at least one of (1) the sulfur oxide content of the gas and (2) the nitrogen oxide content of the gas. The material to be used is the ROS first described above.

In yet another embodiment, the present invention relates to an improved hydrocarbon conversion, preferably cracking, process for converting a sulfur-containing hydrocarbon feedstock. The process comprises (1) contacting the feedstock with solid particles capable of promoting the conversion of the feedstock at hydrocarbon conversion conditions in at least one reaction zone to produce at least one hydrocarbon product and to cause deactivating sulfur-containing carbonaceous material to be formed on the solid particles; (2) contacting the deposit-containing particles with an oxygen-containing vaporous medium at conditions to combust at least a portion of the carbonaceous deposit material in at least one regeneration zone to thereby regenerate at least a portion of the hydrocarbon conversion catalytic activity of the solid particles and to form a regeneration zone flue gas containing sulfur oxide (e.g., sulfur trioxide) and/or nitrogen oxide; and (3) repeating steps (1) and (2) periodically. The present improvement comprises using, in intimate admixture with the solid particles, a minor amount of discrete entities having a chemical make-up which is different from the solid particles and which comprises the ROS first described above. Such discrete entities are present in an amount effective to reduce the amount of sulfur oxides and/or nitrogen oxides in the flue gas.

In one embodiment, the discrete entities also include a minor, catalytically effective amount of at least one crystalline material effective to promote hydrocarbon conversion, e.g., cracking, at hydrocarbon conversion conditions.

The preferred relative amounts of the solid particles and discrete entities are about 80 to about 99 parts and about 1 to about 20 parts by weight, respectively. This catalyst system is especially effective for the catalytic cracking of a hydrocarbon feedstock to lighter, lower boiling products. The present catalyst system also has improved carbon monoxide oxidation catalytic activity and stability.

In another embodiment, the ROS has a surface area (by the conventional B.E.T. method) in the range of about $25m^2/gm.$ to about $600m^2/gm.$, more preferably about $40m^2/gm.$ to about $400m^2/gm.$, and still more preferably about $50m^2/gm.$ to about $300m^2/gm.$ These relatively high surface areas have been found to provide for improved reduction in sulfur oxide and/or nitrogen oxide atmospheric emissions.

This invention can be used to advantage with the catalyst (solid particles and discrete entities) being disposed in any conventional reactor-regenerator system, in ebullating catalyst bed systems, in systems which involve continuously conveying or circulating catalyst between reaction zone and regeneration zone and the like. Circulating catalyst systems are preferred. Typical of the circulating catalyst bed systems are the conventional moving bed and fluidized bed reactor-regenerator systems. Both of these circulating bed systems are conventionally used in hydrocarbon conversion, e.g., hydrocarbon cracking, operations with the fluidized catalyst bed reactor-regenerator systems being preferred.

Although the presently useful solid particles and discrete entities may be used as a physical admixture of separate particles, in one embodiment the discrete entities are combined as part of the solid particles. That is, the discrete entities, e.g., comprising calcined microspheres of the ROS, are combined with the solid particles, e.g., during the manufacture of the solid particles, to form combined particles which function as both the presently useful solid particles and discrete entities. In this embodiment the discrete entities are preferably a separate and distinct phase in the combined particles. One preferred method for providing the combined particles is to calcine the discrete entities prior to incorporating the discrete entities into the combined particles.

The form, i.e., particle size, of the present particles, e.g., both solid particles and discrete entities as well as the combined particles, is not critical to the present invention and may vary depending, for example, on the type of reaction-regeneration system employed. Such particles may be formed into any desired shape such as pills, cakes, extrudates, powders, granules, spheres and the like, using conventional methods. Where, for example, the final particles are designed for use as a fixed bed, the particles may preferably be formed into particles having a minimum dimension of at least about 0.01 inch and a maximum dimension of up to about one-half inch or one inch or more. Spherical particles having a diameter of about 0.03 inch to about 0.25 inch, preferably about 0.03 inch to about 0.15 inch, are often useful, especially in fixed bed or moving bed operations. With regard to fluidized systems, it is preferred that the major amount by weight of the particles have a diameter in the range of about 10 microns to about 250 microns, more preferably about 20 microns to about 150 microns.

The solid particles are capable of promoting the desired hydrocarbon conversion. By "hydrocarbon conversion" is meant a chemical reaction or conversion in which one or more of the feed materials or reactants and/or one or more of the products or conversion products is substantially hydrocarbon in nature, e.g., comprises a major amount of weight of carbon and hydrogen. The solid particles are further characterized as having a composition (i.e., chemical make-up) which is different from the discrete entities. In one preferred embodiment, the solid particles (or the solid particles portion of the combined particles described above) are substantially free of ROS.

The composition of the solid particles useful in the present invention is not critical, provided that such particles are capable of promoting the desired hydrocarbon conversion. Solid particles having widely varying compositions are conventionally used as catalyst in such hydrocarbon conversion processes, the particular composition chosen being dependent, for example, on the type of hydrocarbon chemical conversion desired. Thus, the solid particles suitable for use in the present invention include at least one of the natural or synthetic materials which are capable of promoting the desired hydrocarbon chemical conversion. For example, when the desired hydrocarbon conversion involves one or more of hydrocarbon cracking (preferably in the substantial absence of added free molecular hydrogen), disproportionation, isomerization, hydrocracking, reforming, dehydrocyclization, polymerization, alkylation and dealkylation, such suitable materials include acid-treated natural clays, such as montmorillonite, kaolin and bentonite clays; natural or synthetic amorphous materials, such as alumina, silica, silica-alumina, silica-magnesia and silica-zirconia composites; crystalline materials often referred to a zeolites or molecular sieves, such as aluminosilicates, SAPO, TAPO, MeAPO, LZ-210, LZ-10, and the like. Certain of these crystalline materials are discussed in U.S. Pat. Nos. 4,310,440; 4,440,871; 4,5000,651; and 4,503,023, the specification of each of which patents is incorporated by reference herein.

In certain instances, e.g., hydrocarbon cracking and disproportionation, the solid particles preferably include such crystalline materials to increase catalytic activity. Methods for preparing such solid particles and the combined solid particles-discrete entities particles are conventional and well known in the art. For example, crystalline aluminosilicate compositions can be made from alkali metal silicates and alkali metal aluminates so that they initially contain significant concentrations of alkali metals. Sodium tends to reduce the catalyst activity of the composition for hydrocarbon conversion reactions such as hydrocarbon cracking and disproportionation. Accordingly, most or all of the sodium in the crystalline aluminosilicate is removed or replaced, e.g., with other metal cations such aluminum ions or ions of the rare earths, which are associated with the crystalline aluminosilicates. This can be accomplished by contacting the crystalline aluminosilicate with a source of hydrogen ions such as acids, or hydrogen precursors such as ammonium compounds. These procedures are thoroughly described in U.S. Pat. No. 3,140,253 and RE. 27,639.

Compositions of the solid particles which are particularly useful in the present invention are those in which the crystalline material is incorporated in an amount effective to promote the desired hydrocarbon conversion, e.g., a catalytically effective amount, into a porous matrix which comprises, for example, amorphous material which may or may not be itself capable of promoting such hydrocarbon conversion. Included among such matrix materials are clays and amorphous compositions of alumina, silica, silica-alumina, magnesia, zirconia, mixtures of these and the like. The crystalline material is preferably incorporated into the matrix material in amounts within the range of about 1% to about 75%, more preferably about 2% to about 50%, by weight of the total solid particles. The preparation of crystalline-amorphous matrix catalytic materials is described in the above-mentioned patents. Catalytically active crystalline materials which are formed during and/or as part of the methods of manufacturing the solid particles, discrete entities and/or as part of the methods of manufacturing the solid particles, discrete entities and/or combined particles are within the scope of the present invention. The solid particles are preferably substantially free of added rare earth metal, e.g., cerium, component disposed on the amorphous matrix material of the catalyst, although such rare earth metal components may be associated with the crystalline materials of the solid particles.

The solid particles useful in the catalytic hydrocarbon cracking embodiment of the present invention may be any conventional catalyst capable of promoting hydrocarbon cracking at the conditions present in the reaction zone, i.e., hydrocarbon cracking conditions. Similarly, the catalytic activity of such solid particles is restored at the conditions present in the regeneration zone. Typical among these conventional catalysts are those which comprise amorphous silica-alumina and at least one crystalline aluminosilicate having pore diameters of about 8 angstroms to about 15 angstroms and mixtures thereof. When the solid particles and/or discrete entities to be used in the hydrocarbon cracking embodiment of the present invention contain crystalline aluminosilicate, the crystalline aluminosilicate may include minor amounts of conventional metal promoters such as the rare earth metals, in particular, cerium.

As indicated above, the present ROS comprise an effective amount, preferably a major amount, of at least one spinel containing a first metal and a second metal, preferably alkaline earth metal-containing spinel, a minor amount of at least one component of a different third metal effective to promote the oxidation of sulfur dioxide to sulfur trioxide at sulfur dioxide oxidation conditions, and a minor amount of at least one component of a different fourth metal effective to promote the reduction of first metal sulfate at first metal sulfate reduction conditions In another preferred aspect, the present ROS include amounts of third metal component and fourth metal component which are effective to promote the reduction of nitrogen oxides at nitrogen oxide reduction conditions.

The spinel structure is based on a cubic close-packed array of oxide ions. Typically, the crystallographic unit cell of the spinel structure contains 32 oxygen atoms; one-eighth of the tetrahedral holes (of which there are two per anion) are occupied by divalent metal ion, and one-half of the octahedral holes (of which there are two per anion) are occupied by trivalent metal ions.

This typical spinel structure or a modification thereof is adaptable to many other mixed metal oxides of the type $M^{II}M_2{}^{III}O_4$ (e.g., $FeCr_2O_4$, $SnAl_2O_4$ and $Co^{II}Co_2{}^{III}O_4$), by some of the type $M^{IV}M^{II}{}_2O_4$ (e.g., $TiSn_2O_4$, and $SnCo_2O_4$), and by some of the type $M^I{}_2M^{VI}O_4$ e.g., $Na_2MoO_4$ and $Ag_2MoO_4$). This structure is often symbolized as $X[Y_2]O_4$, where square brackets enclose the ions in the octahedral interstices. An important variant is the inverse spinel structure, $Y[XY]O_4$, in which half of the Y ions are in tetrahedral interstices and the X ions are in octahedral ones along with the other half of the Y ions. The inverse spinel structure is intended to be included within the scope of the term "metal-containing spinel" as used herein. The inverse spinel structure occurs often when the X ions have a stronger preference for octahedral coordination than do the Y ions. All $M^{IV}M_2{}^{II}O_4$ are inverse, e.g., $Sn(SnTi)O_4$, and many of the $M^{II}M_2{}^{III}O_4$ ones are also, e.g., $Fe^{III}(Co^{II}Fe^{III})O_4$, $NiAl_2O_4$, $Fe^{III}(Fe^{II}Fe^{III})O_4$ and $Fe(NiFe)O_4$. There are also many compounds with distorted spinel structures in which only a fraction of the X ions are in tetrahedral sites. This occurs when the preference of both X and Y ions for octahedral and tetrahedral sites do not differ markedly.

Further, details on the spinel structure are described in the following references, which are hereby incorporated herein by reference: "Modern Aspects of Inorganic Chemistry" by H. I. Emeleus and A. G. Sharpe (1973), pp. 57–58 and 512–513; "Structural Inorganic Chemistry", 3rd edition, (1962) by A. F. Wells, pp. 130, 487–490, 503 and 526; and "Advanced Inorganic Chemistry", 3rd edition, by F. A. Cotton and G. Wilkinson (1972), pp. 54–55.

Metal-containing spinels include the following: $MnAl_2O_4$, $FeAl_2O_4$, $CoAl_2O_4$, $NiAl_2O_4$, $ZnAl_2O_4$, $MgTiMgO_4$, $FeMgFeO_4$, $FeTiFeO_4$, $ZnSnZnO_4$, $GaMgGaO_4$, $InMgInO_4$, $BeLi_2F_4$, $MoLi_2O_4$, $SnMg_2O_4$, $MgAl_2O_4$, $CuAl_2O_4$, $(LiAl_5O_8)$, $ZnK_2(CN)_4$, $CdK_2(CN)_4$, $HgK_2(CN)_4$, $ZnTi_2O_4$, $FeV_2O_4$, $MgCr_2O_4$, $MnCr_2O_4$, $FeCr_2O_4$, $CoCr_2O_4$, $NiCr_2O_4$, $ZnCr_2O_4$, $CdCr_2O_4$, $MnCr_2S_4$, $ZnCr_2S_4$, $CdCr_2S_4$, $TiMn_2O_4$, $MnFe_2O_4$, $FeFe_2O_4$, $CoFe_2O_4$, $NiFe_2O_4$, $CuFe_2O_4$, $ZnFe_2O_4$, $CdFe_2O_4$, $MgCo_2O_4$, $TiCo_2O_4$, $CoCo_2O_4$, $ZnCo_2O_4$, $SnCo_2O_4$, $CoCo_2S_4$, $CuCo_2S_4$, $GeNi_2O_4$, $NiNi_2S_4$, $ZnGa_2O_4$, $Wag_2O_4$, and $ZnSn_2O_4$.

The presently useful metal-containing spinels include a first metal and a second metal having a valence (oxidation state) higher than the valence of the first metal. The first and second metals may be the same metal or different metals. In other words, the same metal may exist in a given spinel in two or more different oxidation states. As indicated above, the atomic ratio of the first metal to the second metal in any given spinel need not be consistent with the classical stoichiometric formula for such spinel. In one embodiment, the atomic ratio of the first metal to the second metal in the metal-containing spinel useful in the present invention is at least about 0.17 and preferably at least about 0.25. If the first metal is a mono-valent metal, the atomic ratio of the first metal to the second metal is preferably at least about 0.34, more preferably at least about 0.5.

The preferred metal-containing spinels for use in the present invention are alkaline earth metal spinels, in particular magnesium (first metal) and aluminum (second metal)-containing spinel. Other alkaline earth metal ions, such as calcium, strontium, barium and mixtures thereof, may replace all or a part of the magnesium ions. Similarly, other metal ions, such as iron, chromium, vanadium, manganese, gallium, boron, cobalt, Group IB metals, Group IV metals, Group VA metals, the platinum group metals, the rare earth metals, Te, Nb, Ta, Sc, Zn, Y, Mo, W, Tl, Re, U, Th and mixtures thereof, may replace all or a part of the aluminum ions, preferably only a part of the aluminum ions. When the spinel includes a divalent metal (e.g., magnesium) and a trivalent metal (e.g., aluminum), it is preferred that the atomic ratio of divalent to trivalent metals in the spinel be in the range of about 0.17 to about 2.5, more preferably about 0.25 to about 2.0, and still more preferably about 0.35 to about 1.5.

The metal-containing spinels useful in the present invention may be derived from conventional and well known sources. For example, these spinels may be naturally occurring or may be synthesized using techniques well known in the art. Thus, a detailed description of such techniques is not included herein. A particularly useful process for preparing the ROS is presented in U.S. Pat. application Ser. No. 848,955 filed Apr. 4, 1986 (U.S. Pat. No. 4,728,635) the specification of which is incorporated by reference herein.

Substantially non-interfering proportions of other well known refractory material, e.g., inorganic oxides such as silica, zirconia, thoria and the like may be included in the present ROS. By substantially "non-interfering" is meant amounts of the material which do not have a substantial deleterious effect on the intended functionality of the present ROS, catalyst system, or hydrocarbon conversion process, as the case might be. The inclusion of materials such as silica, silica-alumina, zirconia, thoria and the like into the present ROS may act to improve one or more of the functions of these ROS. Free magnesia and/or alumina (i.e., apart from the alkaline earth metal containing spinel) also may be included in the present ROS, e.g., using conventional techniques. For example, in one embodiment the ROS preferably includes about 0.1% to about 30% by weight of free magnesia (calculated as MgO). Such free magnesia may act to improve the effectiveness of the ROS to reduce sulfur oxide and/or nitrogen oxide atmospheric emissions.

The third metal component and the fourth metal component may be associated with the spinel using any suitable technique or combination of techniques; for example, impregnation, coprecipitation, ion-exchange and the like, well known in the art. Thus, the third metal and fourth metal components may be an integral part of the spinel or may be in a phase separate from the spinel (e.g., deposited on the spinel) or both. These metal components may be associated with the spinel together or in any sequence or by the same or different association techniques. Cost considerations favor the preferred procedure in which the metal components are associated together with the spinel. Impregnation may be carried out by contacting the spinel with a solution, preferably an aqueous solution, of third and fourth metal salts.

The third metal component is chosen from those components effective to promote the oxidation of sulfur dioxide to sulfur trioxide at sulfur dioxide oxidation conditions. The third metal component is preferably a component of a metal selected from the group consisting of Group IB metals, Group IIB metals, Group VIA metals, the rare earth metals, the platinum group metals and mixtures thereof. More preferably, the rare earth metals, the platinum group metals and mixtures thereof. Particularly good results are achieved when the third metal is cerium and/or platinum, with cerium giving outstanding results.

The fourth metal component is chosen from those components effective to promote the reduction of first metal (e.g., magnesium) sulfate at first metal sulfate reduction conditions, such as those conditions prevailing in the typical reaction zone of a hydrocarbon fluid catalytic cracking unit. The fourth metal component is preferably a component of a metal selected from the group consisting of iron, nickel, titanium, chromium, manganese, cobalt, germanium, tin, bismuth, molybdenum, antimony, vanadium and mixtures thereof. More preferably, the fourth metal is selected from iron, nickel, cobalt, manganese, tin, vanadium and mixtures thereof.

The specific amounts of the third and fourth metal components included in the ROS may vary widely, provided that these components are effective as described herein. Preferably, the third metal component is present in an amount between about 0.001% to about 20% by weight, calculated as elemental metal, of the ROS, and the fourth metal component is present in an amount between about 0.001% to about 10% by weight, calculated as elemental metal, of the ROS. It is preferred that excessive amounts of third and/or fourth metal components be avoided, particularly in hydrocarbon conversion applications, to reduce the risk of substantially detrimentally affecting the primary process. Preferably, the ROS include about 0.1% to about 20%, more preferably about 0.05% to about 20%, and still more preferably about 2% to about 15%, by weight of rare earth metal, calculated as elemental metal. Of course, if the platinum group metal is employed in the ROS, very much reduced concentrations (e.g., in the parts per million (ppm) range) are employed. If vanadium is included as the fourth metal component, it is preferably present in an amount of about 0.05% to about 7%, more preferably about 0.1% to about 5%, and still more preferably about 0.2% to about 2% by weight of vanadium, calculated as elemental metal.

It may not be necessary to wash the spinel after certain soluble third and fourth metal salts (such as nitrate or acetate) are added. After impregnation with the third and fourth metal salts, the spinel can be dried and calcined to decompose the salts, forming an oxide in the case of nitrate or acetate. Alternately the spinel, e.g., in the form of discrete particles, can be charged to a hydrocarbon conversion, e.g., cracking, unit with the metals in salt form. In this case, the third and fourth metal salts with thermally decomposable anions can decompose to the oxides in the unit.

The present discrete entities may further comprise a minor amount of at least one crystalline material capable of promoting the desired hydrocarbon conversion. Typical crystalline materials have been described above. Such crystalline materials may comprise about 1% to about 30%, for example, about 1% to about 10%, by weight of the discrete entities. The presence of such crystalline materials in the present discrete entities acts to increase the overall catalytic activity of the solid particles-discrete entities mixture for promoting the desired hydrocarbon conversion.

Preferably, the third and fourth metal components are substantially uniformly disposed in or on the ROS.

Included among the rare earth metals useful in the present invention are the Lanthanum or Lanthanide Series (of the Periodic Chart of Elements) metals and mixtures thereof. The preferred rare earth metals are selected from the group consisting of cerium, praseodymium, lanthanum and mixtures thereof, with cerium being more preferred.

As noted above, the presently useful solid particles and discrete entities can be employed in a mass of combined particles which function as both the solid particles, e.g., promotes hydrocarbon conversion, and the discrete entities. Such combined particles may be produced in any suitable manner, certain of which methods are conventional and known in the art.

Although this invention is useful in many hydrocarbon conversions, the present catalyst, i.e., mixture comprising solid particles and discrete entities, and hydrocarbon conversion process find particular applicability in systems for the catalytic cracking of hydrocarbons where oxidative regeneration of catalyst is employed. Such catalytic hydrocarbon cracking often involves converting, i.e., cracking, heavier or higher boiling components, to gasoline and other lower boiling components, such as hexane, hexene, pentane, pentene, butane, butylene, propane, propylene, ethane, ethylene, methane and mixtures thereof. Often, the substantially hydrocarbon feedstock comprises a gas oil fraction, e.g., derived from petroleum, shale oil, tar sand oil, coal and the like. Such feedstock may comprise a mixture of straight run, e.g., virgin, gas oil. Such gas oil fractions often boil primarily in the range of about 400 degrees F. to about 1000 degrees F. Other substantially hydrocarbon feedstocks, e.g., naphtha, high boiling or heavy fractions of petroleum, petroleum residuum, shale oil, tar sand oil, coal and the like, may be cracked using the catalyst and method of the present invention. Such substantially hydrocarbon feedstock often contains minor amounts of other elements, e.g., sulfur, nitrogen, oxygen and the like. In one aspect, the present invention involves converting a hydrocarbon feedstock containing sulfur and/or sulfur chemically combined with the molecules of hydrocarbon feedstock. The present invention is particularly useful when the amount of sulfur in such hydrocarbon feedstock is in the range of about 0.01% to about 5%, preferably about 0.1% to about 3%, by weight of the total feedstock.

Hydrocarbon cracking conditions are well known and often include temperatures in the range of about 850 degrees F. to about 1100 degrees F., preferably about 900 degrees F. to about 1050 degrees F. Other reaction conditions usually include pressures of up to about 100 psig.; catalyst to oil ratios of about 1 to 2 to about 25 to 1, preferably about 3 to 1 to about 15 to 1; and weight hourly space velocities (WHSV) of about 3 to about 60. These hydrocarbon cracking conditions may be varied depending, for example, on the feedstock and solid particles or combined particles being used, the reactor-regenerator system, e.g., fluid or moving bed catalytic cracking system, being employed and the product or products wanted.

In addition, the catalytic hydrocarbon cracking system includes a regeneration zone for restoring the catalytic activity of the solid particles or combined particles of catalyst previously used to promote hydrocarbon cracking. Carbonaceous, in particular sulfur-containing carbonaceous, deposit-containing catalyst particles from the reaction zone are contacted with free oxygen-containing gas in the regeneration zone at conditions to restore or maintain the activity of the catalyst by removing, i.e., combusting, at least a portion of the carbonaceous material from the catalyst particles. When the carbonaceous deposit material contains sulfur, at least one sulfur-containing combustion product is produced in the regeneration zone and may leave the zone with the regenerator flue gas. The conditions at which such free oxygen-containing gas contacting takes place may vary, for example, over conventional ranges. The temperatures in the catalyst regeneration zone of a hydrocarbon cracking system are often in the range of about 900 degrees F. to about 1500 degrees F., preferably about 1100 degrees F. to about 1350 degrees F. and more preferably about 1100 degrees F. to about 1300 degrees F. Other conditions within such regeneration zone may include, for example, pressures up to about 100 psig., and average catalyst contact times within the range of about 3 minutes to about 75 minutes. Sufficient oxygen is preferably present in the regeneration zone to completely combust the carbon and hydrogen of the carbonaceous deposit material, for example, to carbon dioxide and water. The amount of carbonaceous material deposited on the catalyst in the reaction zone is preferably in the range of about 0.005% to about 15%, more preferably about 0.1% to about 10%, by weight of the catalyst. The amount of sulfur, if any, contained in the carbonaceous deposit material depends, for example, on the amount of sulfur in the hydrocarbon feedstock. This deposit material may contain about 0.01% to about 10% or more by weight of sulfur. At least a portion of the regenerated catalyst is often returned to the hydrocarbon cracking reaction zone.

One embodiment of the present invention involves contacting sulfur oxide and/or nitrogen oxide-containing gases, e.g., combustion products, with the present ROS. Reduced concentrations of sulfur oxide and/or nitrogen oxide, e.g., reduced emissions of sulfur oxide and/or nitrogen oxide from the combustion zones, are achieved as a result of this contacting.

Typical combustion zones include, for example, fluid bed coal burning steam boilers and fluid sand bed waste combustors. In the coal fired boiler application, the present ROS may be added, either separately or with the sulfur-containing coal, to the combustion zone, e.g., boiler, where combustion takes place. The present ROS then leave the combustion zone with the coal ash and can be separated from the ash, e.g., by screening, density separation, or other well known solids separation techniques. In one embodiment, the sulfur oxide-containing gases are contacted with the present ROS at conditions to reduce the sulfur oxide content of the gases in one or more zones, e.g., separate from the combustion zone. In any event, the flue gases leaving the combustion zone/contacting zone system have reduced amounts of sulfur oxide and/or nitrogen oxide, e.g., relative to processing in the absence of the present ROS. The ROS from the combustion zone or contacting zone can be subjected to a reducing environment, e.g., contacted with hydrogen, hydrocarbon and the like reducing media, at conditions such that at least a portion of the sulfur associated with the ROS is disassociated, e.g., in the form of hydrogen sulfide and is removed for further processing, e.g., sulfur recovery. The ROS, after sulfur removal may be recycled to the combustion zone or contacting zone.

Conditions within such contacting zones may be those typically used in contact zones employing conventional sulfur oxide or nitrogen oxide removal agents. The amount of the present ROS used to contact a sulfur oxide-containing and/or a nitrogen oxide containing gas is sufficient to reduce the sulfur oxide and/or nitrogen oxide content of the gas, preferably, by at least about 50% and more preferably by at least 80%. Reducing conditions are such that at least a portion, preferably at least about 50% and more preferably at least about 80% of the sulfur associated with the ROS is removed. For example, reducing conditions may include temperatures in the range of about 900 degrees F. to about 1800 degrees F.; pressures in the range of about 14 to about 100 psig; and reducing media, e.g., hydrogen, hydrocarbon and the like, to associated sulfur mole ratio in the range of about 1 to about 10.

The following examples are provided to better illustrate the invention, without limitation, by presenting several specific embodiments of the compositions processes of the invention.

EXAMPLES 1 TO 14

A series of magnesium, aluminum-containing spinel compositions were prepared as follows.

Magnesium, aluminum-containing spinel particles were prepared using conventional co-precipitation/calcining techniques. The resulting spinel had a surface area of more than 100 m$^2$/gm. (square meters per gram); and an atomic ratio of magnesium to aluminum of 0.77. The average particle size of the spinel particles was in the range of about 65 microns.

Fourteen portions of these spinel particles were subjected to conventional impregnation/calcining techniques using aqueous solutions of various metal salts to prepare the following fourteen compositions:

| Composition/Example | Wt. % of Metal (as Elemental Metal) Included with the Spinel Particles |
|---|---|
| Example 1 | 5% Cerium |
| Example 2 | 10% Cerium |
| Example 3 | 20% Cerium |
| Example 4 | 10% Praseodymium |
| Example 5 | 10% Lanthanum |
| Example 6 | 10% Iron |
| Example 7 | 10% Manganese |
| Example 8 | 10% Cobalt |
| Example 9 | 5% Vanadium |
| Example 10 | 2% Vanadium/10% Cerium |
| Example 11 | 10% Tin |
| Example 12 | 5% Tin/5% Cerium |
| Example 13 | 1% Iron/10% Cerium |
| Example 14 | 5% Iron/5% Tin |

*When two metals are included with the spinel particles, the spinel particles were impregnated with both metals simultaneously.

The impregnation/calcining of the various portions of the spinel particles did not substantially change the surface area of the spinel or the size of the particles.

EXAMPLES 15-28

A quantity of solid particles of a commercially available, crystalline aluminosilicate hydrocarbon cracking catalyst, having the same approximate particle size distribution as the spinel-containing particles from Examples 1 to 14, was combined with each of the final products of Examples 1 to 14 so that mixtures of 1.75 parts by weight of the spinel-containing particles (discrete entities) and 98.25 parts by weight of the solid particles resulted. The catalytic activity of the solid particles was equilibrated by use (prior to combining with the discrete entities) in commercial fluid bed catalytic cracking service.

Each blend was tested to determine its ability to continue to remove sulfur oxides over a period of time. This test procedure was as follows: Step 1 involved an initial determination of the ability of the blend to remove sulfur oxides from regenerator flue gases. Step one was carried out in a fluid bed catalytic cracking pilot plant known to provide results which are correlatable to results obtained in commercial sized systems. The feedstock and conditions for step 1 were as follows:

Feedstock—mid-continent gas oil containing about 2% by weight sulfur
Reactor temperature—1000 degrees F.
Regenerator temperature—1280 degrees F.
Stripper temperature—930 degrees F.
Pressure—15 psia.
Approximate catalyst regeneration time—30 minutes
Catalyst to oil weight ratio—6
Weight hourly space velocity—10
Steam as inerts in reactor, 3 mole %.

Step 2 of the test procedure involved continuous and accelerated aging in a fluidized-bed reactor to simulate the type of aging which occurs in commercial fluid-bed catalytic cracking service. The feedstock and conditions utilized in step 2 were as follows:

Feedstock—mid-continent gas oil containing 2% by weight sulfur
Reactor temperature—1150 degrees F.
Reactor pressure—15 psig.
Reaction catalyst/oil weight ratio—15
Weight hourly space velocity—0.8
Regenerator temperature—1350 degrees F.
Regenerator pressure—15 psig.
Catalyst regenerator residence time—30 minutes
Regenerator combustion air flow ratio—20 lbs. air/lb. coke
Cycles per day—11

Step 3 of the test procedure involved periodically repeating step 1 to determine how much of the blend's activity to remove sulfur oxide had been lost during the aging of step 2.

The amount of total sulfur oxides emitted with the flue gases from the regeneration using the blend was used as the basis for determining the blend's ability (or activity) to remove such sulfur oxides.

Results of testing these blends were as follows:

| | | RELATIVE ACTIVITY TO REMOVE SULFUR OXIDES |
|---|---|---|
| Example 1 | Virgin | 52 |
| Example 1 | Aged 2 days | — |
| Example 2 | Virgin | 83 |
| Example 2 | Aged 2 days | 32 |
| Example 3 | Virgin | 83 |
| Example 3 | Aged 2 days | 42 |
| Example 4 | Virgin | 32 |
| Example 4 | Aged 2 days | — |
| Example 5 | Virgin | 40 |
| Example 5 | Aged 2 days | 31 |
| Example 6 | Virgin | 31 |
| Example 6 | Aged 2 days | — |
| Example 7 | Virgin | 36 |
| Example 7 | Aged 2 days | — |
| Example 8 | Virgin | 6 |
| Example 8 | Aged 2 days | — |
| Example 9 | Virgin | 81 |
| Example 9 | Aged 2 days | 27 |
| Example 10 | Virgin | 96 |
| Example 10 | Aged 2 days | 78 |
| Example 11 | Virgin | less than 25 |
| Example 11 | Aged 2 days | — |
| Example 12 | Virgin | 56 |
| Example 12 | Aged 2 days | — |
| Example 13 | Virgin | 88 |
| Example 13 | Aged 2 days | 38 |
| Example 14 | Virgin | 47 |
| Example 14 | Aged 2 days | — |

These data indicate clearly that compositions according to the present invention, i.e., Compositions 12 and 13, have substantial initial sulfur oxide removal activity. For example, the initial sulfur oxide removal activity of Composition 12 (5% tin/5% cerium) is increased relative to that of Composition 1 (5% cerium) or Composition 11 (10% tin). Composition 13 (1% iron/10% cerium) has an increased initial sulfur oxide removal activity relative to that of Composition 2 (10% cerium)

or Composition 6 (10% iron). In addition, the sulfur oxide removal activity stability, i.e., the ability to maintain sulfur oxide removal activity over a period of time, of Composition 13 is increased relative to that of Composition 2.

EXAMPLES 29-30

Samples of virgin and aged Compositions 12 and 13 are taken from a point between the reaction zone and the regeneration zone of the above-noted catalytic cracking pilot plant and are analyzed for sulfur content. It is found that the sulfur contents of these samples are significantly lower than those of other materials, such as Compositions 1, 2 and 3. Thus, it appears that the spinel-containing discrete entities of Compositions 12 and 13 have reduced sulfur contents coming out of the reaction zone. This, in turn, provides each of the Composition 12 and 13 with an increased kinetic driving force for sulfur oxide removal in the regeneration zone.

EXAMPLES 31-32

Each of the Compositions 12 and 13 is tested to determine its ability to reduce the nitrogen oxide (NOx) content of the flue gases from a cracking catalyst regeneration zone. Thus, a sample of each of these blends is subjected to twenty two reaction/regeneration cycles using step (2) of the test procedure set forth above in Examples 15 to 28. After this aging, the blend is tested in accordance with step (1) of the above-noted test procedure and the nitrogen oxide content of the regeneration zone flue gases is measured. Results of these tests indicate that Compositions 12 and 13 according to the present invention do provide for reduction in nitrogen oxide emissions from combustion zone flue gases.

While this invention has been described with respect to various specific examples and embodiments, it is to be understood that the invention is not limited thereto and that it can be variously practiced within the scope of the following claims.

We claim:

1. A composition of matter comprising at least one metal-containing spinel which includes a first metal and a second metal having a valence higher than the valence of said first metal, at least one component of a third metal other than said first and second metal effective to promote the oxidation of sulfur dioxide to sulfur trioxide at sulfur dioxide oxidation conditions, and at least one component of a fourth metal other than said first, second and third metals effective to promote the reduction of first metal sulfate at first metal sulfate reduction conditions; provided that in the event said third metal is rare earth metal, said fourth metal is other than vanadium.

2. The composition of claim 1 wherein said spinel has a surface area in the range of about 25 m²/gm. to about 600 m²/gm.

3. The composition of claim 2 wherein said composition comprises a major amount by weight of said spinel.

4. The composition of claim 1 wherein said third metal is selected from the group consisting of Group IB metals, Group IIB metals, Group VIA metals, the rare earth metals, the Platinum Group metals and mixtures thereof, and said fourth metal is selected from the group consisting of iron, nickel, titanium, chromium, manganese, cobalt, germanium, tin, bismuth, molybdenum, antimony, vanadium and mixtures thereof.

5. The composition of claim 1 wherein at least one of said third metal component and said fourth metal component is incorporated in said composition by impregnation.

6. The composition of claim 1 wherein said spinel comprises alkaline earth metal-containing spinel and the atomic ratio of said first metal to said second metal is at least about 0.17.

7. The composition of claim 1 wherein said third metal component and said fourth metal component are present in amounts effective to promote the reduction of nitrogen oxides at nitrogen oxide reduction conditions.

8. The composition of claim 4 wherein said third metal is selected from the group consisting of the rare earth metals, the platinum group metals and and mixtures thereof.

9. The composition of claim 4 wherein said fourth metal is selected from the group consisting of iron, nickel, cobalt, manganese, tin, vanadium and mixtures thereof.

10. The composition of claim 8 wherein said fourth metal is selected from the group consisting of iron, nickel, cobalt, manganese, tin, vanadium and mixtures thereof.

11. The composition of claim 1 wherein third metal component is present in an amount in the range of about 0.001% to about 20% by weight, calculated as elemental third metal, and said vanadium component is present in an amount in the range of about 0.001% to about 10% by weight, calculated as elemental fourth metal.

12. The composition of claim 4 wherein said spinel comprises alkaline earth metal-containing spinel and the atomic ratio of said first metal to said second metal is at least about 0.17.

13. The composition of claim 9 wherein said spinel comprises alkaline earth metal-containing spinel and the atomic ratio of said first metal to said second metal is at least about 0.17.

14. The composition of claim 4 wherein said spinel includes magnesium as said first metal and aluminum as said second metal, and the atomic ratio of magnesium to aluminum in said spinel is at least about 0.25.

15. The composition of claim 9 wherein said spinel includes magnesium as said first metal and aluminum as said second metal, and the atomic ratio of magnesium to aluminum in said spinel is at least about 0.25.

16. The composition of claim 10 wherein said spinel includes magnesium as said first metal and aluminum as said second metal, and the atomic ratio of magnesium to aluminum in said spinel is at least about 0.25.

17. The composition of claim 4 further comprising about 0.1% to about 30% by weight of free magnesia, calculated as MgO.

18. The composition of claim 9 further comprising about 0.1% to about 30% by weight of free magnesia, calculated as MgO.

19. The composition of claim 10 further comprising about 0.1% to about 30% by weight of free magnesia, calculated as MgO.

20. The composition of claim 10 wherein said third metal is selected from the group consisting of cerium, platinum and mixtures thereof, and said fourth metal is selected from the group consisting of iron, nickel, vanadium and mixtures thereof.

21. A composition of matter comprising, in intimate admixture, a major amount of solid particles capable of promoting hydrocarbon conversion at hydrocarbon conversion conditions, and of discrete entities having a chemical make-up different from said solid particles and comprising at least one metal-containing spinel which includes a first metal and a second metal having a valence higher than the valence of said first metal, at least one component of a third metal other than said first and second metals component effective to promote the oxidation of sulfur dioxide to sulfur trioxide at sulfur dioxide oxidation conditions, and a minor amount of at least one component of a fourth metal other than said first, second and third metals effective to promote the reduction of first metal sulfate at first metal sulfate reduction conditions; provided that in the event said third metal is rare earth metal, said fourth metal is other than vanadium.

22. The composition of claim 21 wherein said hydrocarbon conversion comprises hydrocarbon cracking in the substantial absence of added molecular hydrogen, at least one of said solid particles and discrete entities includes crystalline aluminosilicate effective to promote said hydrocarbon cracking and a major amount by weight of said solid particles have diameters in the range of about 10 microns to about 250 microns.

23. The composition of claim 21 wherein said discrete entities contain a major amount by weight of said spinel and said spinel has a surface area in the range of about 25 m²/gm. to about 600 m²/gm.

24. The composition of claim 21 wherein said third metal is selected from the group consisting of Group IB metals, Group IIB metals, Group IV A metals, the rare earth metals, the Platinum Group metals and mixtures thereof, and said fourth metal is selected from the group consisting of iron, nickel, titanium, chromium, manganese, cobalt, germanium, tin, bismuth, molybdenum, antimony, vanadium and mixtures thereof.

25. The composition of claim 21 wherein at least one of said third metal component and said fourth metal component is incorporated in said discrete entities by impregnation.

26. The composition of claim 21 wherein said spinel comprises alkaline earth metal-containing spinel and the atomic ratio of said first metal to said second metal is at least about 0.17.

27. The composition of claim 21 wherein said third metal component and said fourth metal component are present in amounts effective to promote the reduction of nitrogen oxides at nitrogen oxide reduction conditions.

28. The composition of claim 24 wherein said third metal is selected from the group consisting of the rare earth metals, the platinum group metals and mixtures thereof.

29. The composition of claim 24 wherein said fourth metal is selected from the group consisting of iron, nickel, cobalt, manganese, tin, vanadium and mixtures thereof.

30. The composition of claim 28 wherein said fourth metal is selected from the group consisting of iron, nickel, cobalt, manganese, tin, vanadium and mixtures thereof.

31. The composition of claim 24 wherein said spinel comprises alkaline earth metal-containing spinel and the atomic ratio of said first metal to said second metal is at least about 0.17.

32. The process of claim 29 wherein said spinel comprises alkaline earth metal-containing spinel and the atomic ratio of said first metal to said second metal is at least about 0.17.

33. The composition of claim 24 wherein said spinel includes magnesium as said first metal and aluminum as said second metal, and the atomic ratio of magnesium to aluminum in said spinel is at least about 0.25.

34. The composition of claim 29 wherein said spinel includes magnesium as said first metal and aluminum as said second metal, and the atomic ratio of magnesium to aluminum in said spinel is at least about 0.25.

35. The composition of claim 30 wherein said spinel includes magnesium as said first metal and aluminum as said second metal, and the atomic ratio of magnesium to aluminum in said spinel is at least about 0.25.

36. The composition of claim 24 further comprising about 0.1% to about 30% by weight of free magnesia, calculated as MgO.

37. The composition of claim 29 further comprising about 0.1% to about 30% by weight of free magnesia, calculated as MgO.

38. The composition of claim 30 further comprising about 0.1% to about 30% by weight of free magnesia, calculated as MgO.

39. The composition of claim 21 wherein said third metal component is present in an amount in the range of about 0.001% to about 20% by weight, calculated as elemental third metal, and said vanadium component is present in an amount in the range of about 0.001% to about 10% by weight, calculated as elemental fourth metal.

40. The composition of claim 30 wherein said third metal is selected from the group consisting of cerium, platinum and mixtures thereof, and said fourth metal is selected from the group consisting of iron, nickel, vanadium and mixtures thereof.

* * * * *